United States Patent
Dolganow et al.

(10) Patent No.: US 8,626,954 B2
(45) Date of Patent: Jan. 7, 2014

(54) APPLICATION-AWARE M:N HOT REDUNDANCY FOR DPI-BASED APPLICATION ENGINES

(75) Inventors: Andrew Dolganow, Kanata (CA); Steven Edward Morin, Ottawa (CA)

(73) Assignee: Alcatel Lucent, Paris (FR)

( * ) Notice: Subject to any disclaimer, the term of this patent is extended or adjusted under 35 U.S.C. 154(b) by 412 days.

(21) Appl. No.: 12/200,658

(22) Filed: Aug. 28, 2008

(65) Prior Publication Data

US 2010/0057940 A1     Mar. 4, 2010

(51) Int. Cl.
*G06F 15/16* (2006.01)

(52) U.S. Cl.
USPC .......................... 709/249; 370/401; 709/230

(58) Field of Classification Search
USPC .......................................................... 709/249
See application file for complete search history.

(56) References Cited

U.S. PATENT DOCUMENTS

| | | | | |
|---|---|---|---|---|
| 5,008,805 A * | 4/1991 | Fiebig et al. | .................... | 700/79 |
| 5,664,090 A * | 9/1997 | Seki et al. | ........................ | 714/15 |
| 6,195,760 B1 * | 2/2001 | Chung et al. | ........................ | 714/4 |
| 6,266,781 B1 * | 7/2001 | Chung et al. | ........................ | 714/4 |
| 6,711,606 B1 * | 3/2004 | Leymann et al. | ............ | 709/203 |
| 7,583,665 B1 * | 9/2009 | Duncan et al. | ................ | 370/389 |
| 7,711,712 B2 * | 5/2010 | Kano | ............................ | 707/674 |
| 2004/0139128 A1 * | 7/2004 | Becker et al. | ................ | 707/204 |
| 2004/0205206 A1 * | 10/2004 | Naik et al. | .................... | 709/230 |
| 2005/0060418 A1 * | 3/2005 | Sorokopud | .................... | 709/230 |
| 2005/0198247 A1 * | 9/2005 | Perry et al. | .................... | 709/223 |
| 2006/0173870 A1 * | 8/2006 | Erdmenger et al. | .......... | 707/100 |
| 2007/0058629 A1 * | 3/2007 | Luft | ............................... | 370/390 |
| 2007/0300234 A1 * | 12/2007 | Dekel et al. | .................... | 719/313 |
| 2008/0010487 A1 * | 1/2008 | Dekel et al. | ........................ | 714/4 |
| 2008/0016389 A1 * | 1/2008 | Talaugon et al. | ................. | 714/4 |
| 2008/0019264 A1 * | 1/2008 | Lafleur et al. | .................. | 370/217 |
| 2008/0028009 A1 * | 1/2008 | Ngo | .............................. | 707/204 |
| 2008/0209146 A1 * | 8/2008 | Imazu et al. | ................... | 711/162 |
| 2008/0225850 A1 * | 9/2008 | Oran et al. | ..................... | 370/392 |
| 2008/0262991 A1 * | 10/2008 | Kapoor et al. | ................... | 706/20 |
| 2008/0267628 A1 * | 10/2008 | Li et al. | ............................ | 398/79 |
| 2009/0003349 A1 * | 1/2009 | Havemann et al. | ........... | 370/392 |
| 2009/0063893 A1 * | 3/2009 | Bagepalli et al. | ................. | 714/4 |
| 2009/0086651 A1 * | 4/2009 | Luft et al. | ...................... | 370/253 |
| 2009/0219813 A1 * | 9/2009 | Dolganow et al. | ........... | 370/231 |
| 2009/0252148 A1 * | 10/2009 | Dolganow et al. | ............ | 370/351 |
| 2009/0285225 A1 * | 11/2009 | Dahod | .......................... | 370/401 |
| 2009/0296613 A1 * | 12/2009 | Kahn et al. | ..................... | 370/310 |
| 2009/0296700 A1 * | 12/2009 | Stevens et al. | ................. | 370/389 |
| 2009/0300153 A1 * | 12/2009 | Ray et al. | ....................... | 709/223 |
| 2009/0316698 A1 * | 12/2009 | Menten | .......................... | 370/392 |
| 2010/0054142 A1 * | 3/2010 | Moiso et al. | ................... | 370/252 |
| 2010/0182918 A1 * | 7/2010 | Clevy et al. | .................... | 370/252 |
| 2010/0226369 A9 * | 9/2010 | Havemann et al. | ........... | 370/392 |
| 2010/0250733 A1 * | 9/2010 | Turanyi et al. | ................ | 709/224 |

* cited by examiner

*Primary Examiner* — Hamza Algibhah
(74) *Attorney, Agent, or Firm* — Kramer & Amado, P.C.

(57) ABSTRACT

A packet processing system for providing application-aware hot redundancy and a related card and methods are disclosed. The system may include a plurality of active devices, each including a processor configured to perform deep packet inspection to identify an application associated with an active flow, and a redundancy block configured to determine whether the application requires hot redundancy and, if so, to forward a message from which state information may be derived. The system may also include at least one protecting device in communication with each of the active devices and configured to receive the message regarding the active flow from the active device, derive state information from the message, and resume packet forwarding operations for the active flow upon failure of a respective active device of the plurality of active devices.

22 Claims, 7 Drawing Sheets

APPLICATION-AWARE M:N HOT REDUNDANCY FOR DPI-BASED APPLICATION ENGINES

BACKGROUND OF THE INVENTION

1. Field of the Invention

This invention relates generally to providing a redundancy scheme for deep packet inspection engines.

2. Description of Related Art

Telecommunication service providers often advertise the reliability of their services by listing the percentage of time per year that their equipment provides full service. For example, many service providers guarantee "6-nines" availability, which translates to around thirty seconds of system downtime per year. In order to ensure high levels of customer satisfaction and retention, it is imperative that service providers adhere to the guaranteed level of service.

Given the stringent requirements faced by service providers, equipment manufacturers strive to produce reliable hardware and software that minimize system downtime. However, because a typical service provider simultaneously operates thousands of pieces of equipment, hardware and software failure are inevitable. In an attempt to minimize the effect of such failures on service availability, service providers frequently utilize redundancy schemes, whereby a backup piece of equipment may be quickly activated upon failure of a primary piece of equipment.

Service providers use several variations of a redundancy scheme, depending on cost restraints, availability requirements, and a number of other factors. In a 1+1 redundancy scheme, one piece of redundant equipment is provided for each piece of active equipment. This scheme maximizes reliability, such that the system may reliably handle failure of multiple devices at once. Alternatively, to allow for cost savings at the expense of reliability, a service provider may utilize one redundant device for each set of N active devices. A compromise between the 1+1 and 1:N redundancy scheme may be reached by utilizing N redundant devices for every M active devices, where N is less than M.

Regardless of the redundancy scheme selected, the service provider must also determine whether to use hot redundancy, warm redundancy, or a combination thereof. In a hot redundant system, the redundant device maintains configuration data, equipment availability, and state information. Accordingly, in the event of failure of the active device, the redundant device is ready to immediately resume operation with no service outage. In contrast, a redundant device implementing warm redundancy stores configuration data and equipment availability, but does not store state information. Accordingly, upon failure of the active device, the warm redundant device may resume operation without having to boot-up, but must learn state information, thereby introducing a slight impact on the provided service.

As is apparent from the above description, redundancy schemes are complex and require a significant amount of planning, configuration, and maintenance for successful implementation. With the ever-increasing complexity of network infrastructures, redundancy schemes are experiencing a corresponding increase in complexity. This increase in complexity is well-illustrated by the problem of providing redundancy for deep packet inspection (DPI) devices.

DPI devices are increasingly deployed in telecommunications networks. These devices examine packets in a particular flow and identify an application associated with the flow. Using information about the application identified by the DPI device, service providers may, inter alia, increase the quality of service and more fairly bill customers based on their network usage. Thus, although DPI engines provide significant benefits to service providers, they also introduce significant expenses and complexities in high availability systems for which redundancy is required.

Current redundancy schemes fail to minimize the costs associated with a high-availability scheme when DPI devices are used by the service provider. In particular, a conventional approach to high-availability mandates 1+1 hot redundancy, such that the service provider needs to purchase a backup DPI device for each primary DPI device and must modify its network such that both devices always process the entirety of the traffic to learn and maintain state information. This is very costly, given the complexity of DPI devices, especially given that, in many situations, only a subset of applications is important enough to require hot redundant support. Thus, current solutions fail to effectively provide redundancy for the DPI-based application engines in an efficient, cost-effective manner.

Accordingly, there is a need for a redundancy scheme for DPI-based application engines that eliminates the need for 1+1 hot redundancy. In particular, there is a need for an M:N redundancy scheme, where N is less than or equal to M, that maximizes efficiency in providing redundancy by considering application information known by the DPI engine. Additionally, there is a need for a M:N redundancy scheme with a reduced complexity of implementation.

The problems described above are illustrative of those that are addressed by the various exemplary embodiments and are not intended to be exhaustive or limiting of the possible problems addressed or solved. Furthermore, the foregoing objects and advantages of the invention are merely illustrative and are not intended to be exhaustive or limiting of the possible advantages that can be realized. Thus, these and other objects and advantages of the various exemplary embodiments will be apparent from the description herein or can be learned from practicing the various exemplary embodiments, both as embodied herein or as modified in view of any variation that may be apparent to those skilled in the art. Accordingly, the present invention resides in the novel methods, arrangements, combinations, and improvements herein shown and described in various exemplary embodiments.

SUMMARY OF THE INVENTION

In light of the present need for an efficient redundancy mechanism for DPI-based application engines, a brief summary of various exemplary embodiments is presented. Some simplifications and omissions maybe made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments rely on the application awareness of a DPI engine to more efficiently provide a redundancy scheme. In particular, by examining packets forwarded through a network device, a DPI engine identifies the application associated with each flow. Based on the identified application, the device determines whether to provide redundancy for the particular user and its flow and what type of redundancy to provide. For example, the device may provide hot redundancy only for high priority or long duration applications, such as video, telecommunications, and Voice Over Internet Protocol (VoIP). In contrast, the card may determine that it is not worth the additional expense to provide hot redundancy for short duration flows, such as email or web browsing.

By efficiently implementing a redundancy scheme, various exemplary embodiments reduce costs and minimize complexity, while maintaining high performance. Furthermore, by providing hot redundancy based on application-level policies, various exemplary embodiments enable a service provider to not only reduce costs, but also to effectively provide a guaranteed quality of service or charge differently on a per-application basis, even in the event of hardware or software failure.

BRIEF DESCRIPTION OF THE DRAWINGS

In order to better understand various exemplary embodiments, reference is made to the accompanying drawings, wherein.

DETAILED DESCRIPTION OF THE PREFERRED EMBODIMENTS OF THE INVENTION

Figure 1:
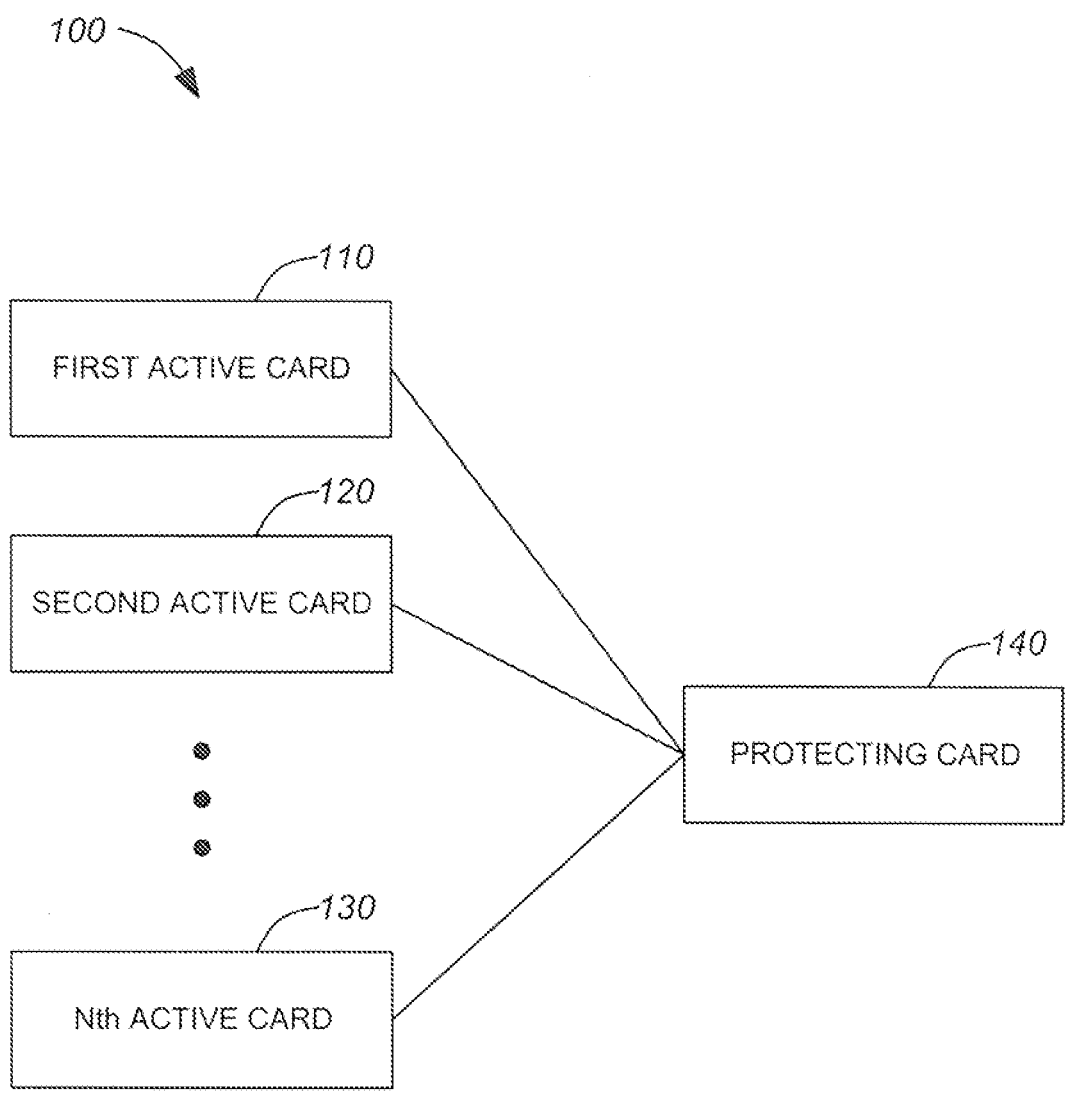
FIG. 1 is a schematic diagram of an exemplary system used to implement a redundancy scheme for DPI-based application engines.

Referring now to the drawings, in which like numerals refer to like components or steps, there are disclosed broad aspects of various exemplary embodiments.

FIG. 1 is a schematic diagram of an exemplary system 100 used to implement a redundancy scheme for DPI-based application engines. In various exemplary embodiments, system 100 includes first active card 110, second active card 120, Nth active card 130, and protecting card 140. It should be apparent that, although system 100 is illustrated as including three active cards 110, 120, 130, system 100 may include N active cards, where N is a positive integer. Thus, system 100 implements a 1:N redundancy scheme.

It should also be apparent that, although system 100 is illustrated using active and protecting cards, the cards may represent other devices including, but not limited to, DPI-capable processors on one or multiple cards, DPI-capable processing cores inside a single processor, DPI-based network elements such as standalone DPI devices, and similar devices that will be apparent to those of skill in the art. Thus, in the following description, it should be apparent that any of these devices may be substituted for the active and protecting cards.

In various exemplary embodiments, active cards 110, 120, 130 are line cards used to receive, process, and forward data packets over one or more communication links. It should be apparent, however, that active cards 110, 120, 130 may be any network devices for which a redundancy scheme is desired. Thus, in various exemplary embodiments, each of the active cards 110, 120, 130 is an input-output module (IOM), media dependent adapter (MDA), or any other component for which redundancy is desirable. Each of the active cards 110, 120, 130 may be installed in a separate slot of a telecommunications switch or other piece of equipment. Active cards 110, 120, 130 each implement a redundancy scheme according to the processing described further below with reference to FIG. 4 or FIGS. 6A and 6B.

In various exemplary embodiments, protecting card 140 is an additional line card or telecommunication device used to support high availability of system 100. In particular, protecting card 140 serves as a redundant or backup card such that protecting card 140 resumes packet processing and forwarding upon failure of one or more active cards 110, 120, 130. Accordingly, protecting card 140 may implement a redundancy scheme according to the processing described further below with reference to FIG. 5 or FIG. 7.

Although illustrated as implementing a 1:N redundancy scheme, it should be apparent that system 100 may include any number of active cards and any number of protecting cards. Thus, system 100 may implement an M:N redundancy scheme, where N is an integer less than or equal to M. For example, system 100 could include two protecting cards and four active cards, such that system 100 implements a 4:2 redundancy scheme. Other variations on the redundancy schemes described herein will be apparent to those of ordinary skill in the art.

Figure 2:
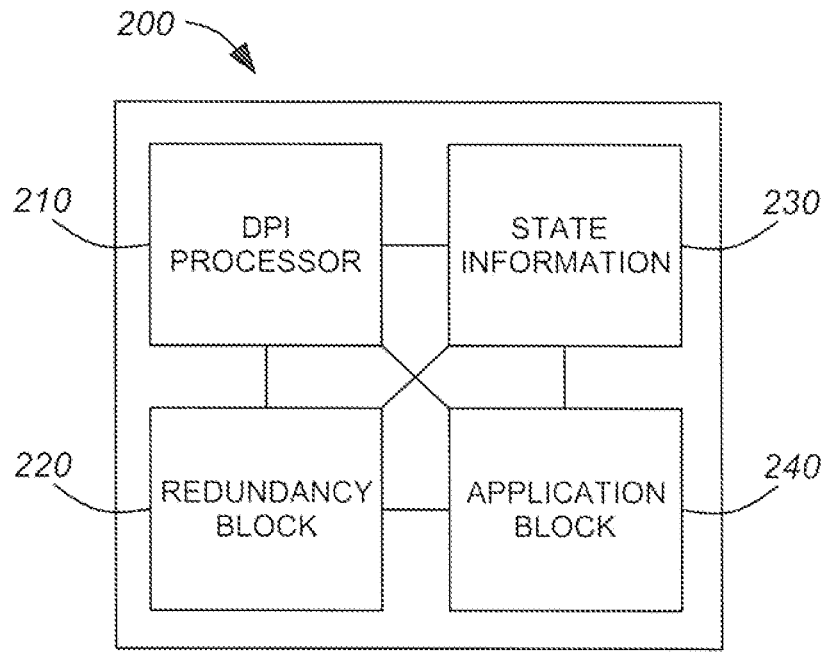
FIG. 2 is a schematic diagram of an exemplary card used in the system of FIG. 1.

FIG. 2 is a schematic diagram of an exemplary card 200 used in system 100 of FIG. 1. In various exemplary embodiments, card 200 includes DPI processor 210, redundancy block 220, state information 230, and application block 240. It should be apparent that, for the purpose of simplicity, only the components used for providing redundancy functionality are illustrated as separate blocks and a 1 to 1 mapping is used from DPI processor 210 to the rest of the redundancy providing blocks 220, 230, 240. It should therefore be apparent that card 200 may also include known components, such as an interface for receiving packets, an interface for forwarding packets, and one or more additional processors or storage media. Furthermore, some of the redundancy-providing components 220, 230, 240 may serve more than one DPI processor.

In various exemplary embodiments, DPI processor 210 is a microprocessor or executable software configured to examine any combination of information in layers 2 through 7 of the Open Systems Interconnection (OSI) model. Thus, in various exemplary embodiments, DPI processor 210 performs a "deep" analysis of one or more packets in order to identify an application associated with the packets. For example, DPI processor 210 may analyze a packet to determine whether the packet relates to email, streaming video, web browsing, peer-to-peer transfer, VoIP, teleconferencing, or any other application of interest to the service provider. In various exemplary embodiments, the analysis performed by DPI processor 210 includes at least one of signature and pattern matching, stateful monitoring, behavioral analysis, and statistical analysis.

In various exemplary embodiments, redundancy block 220 comprises hardware, software, or a combination thereof that executes the functionality required to implement redundancy in card 200. Thus, redundancy block 220 may be a set of instructions encoded on a computer-readable storage medium and configured for execution by a processor. Alternatively, redundancy block 220 may comprise a processor, Field Programmable Gate Array (FPGA), or any other hardware mechanism that may be pre-configured to execute a set of instructions. Furthermore, redundancy block 220 may be configured to allow communication of information between active cards 110, 120, 130 and protecting card 140.

When card 200 corresponds to an active card 110, 120, 130, redundancy block 220 may implement a redundancy scheme described further below with reference to FIG. 4 or FIGS. 6A and 6B. In addition, redundancy block 220 may be configured to exchange messages with protecting card 140, such that protecting card 140 is aware when failure has occurred on active card 110, 120, 130 and may resume operations of active card 110, 120, 130. Conversely, when card 200 corresponds to protecting card 140, redundancy block 220 may implement a redundancy scheme described further below with reference to FIG. 5 or FIG. 7.

In various exemplary embodiments, state information 230 stores data regarding the flows currently managed by the particular card 200. Accordingly, state information 230 may include data necessary to forward packets associated with a flow, including Internet Protocol (IP) 5-tuple information, application identifiers, policy information, user identification, etc. State information may also include application information identifying the application associated with each flow and application policy information. State information 230 may be stored on a computer-readable storage medium contained in or otherwise accessible to card 200.

When card 200 is an active card 110, 120, 130, state information 230 may maintain data regarding all current flows. Alternatively, when card 200 corresponds to protecting card 140, state information 230 may maintain data only for flows for which hot redundancy is desired, Thus, as described in further detail below, protecting card 140 may provide hot redundancy for select applications for multiple active cards 110, 120, 130, while providing warm or no redundancy for all other applications. Upon failure of active card 110, 120, 130, protecting card 140 may therefore immediately restore packet processing and forwarding for the selected applications.

In various exemplary embodiments, application block 240 implements application-specific processing based on the application identified by DPI processor 210. For example, application block 240 may mark packets based on a required Quality of Service, drop packets, collect statistics, and manage billing. Application block 240 maybe a set of instructions encoded on a computer-readable storage medium and configured for execution by a processor. Alternatively, application block 240 may comprise a processor, Field Programmable Gate Array (FPGA), or any other hardware mechanism that may be pre-configured to execute a set of instructions.

It should be apparent that, although described above as distinct components, DPI processor 210, redundancy block 220, state information 230, and application block 240 may be merged into fewer modules. Alternatively, the functions performed by one or more of the components 210, 220, 230, 240 may be separated into multiple components, such that card 200 includes additional components. Alternative arrangements of the functionality of card 200 will be apparent to those of ordinary skill in the art.

Figure 3:
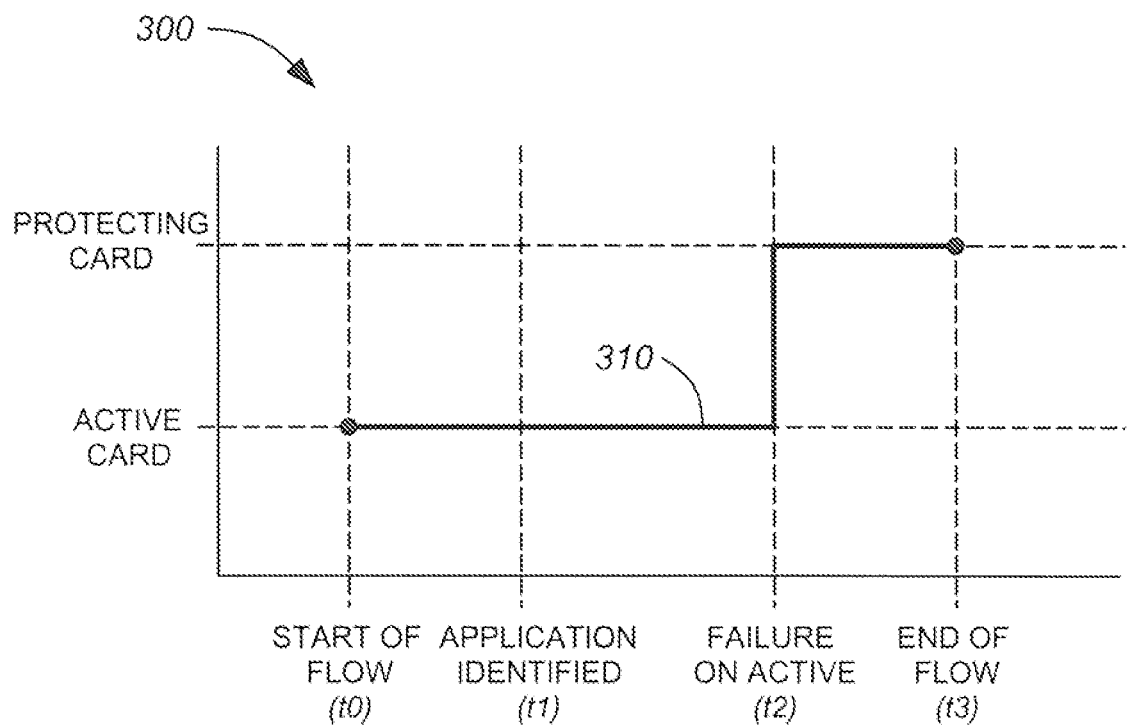
FIG. 3 is a timing diagram illustrating the transition from an active DPI card to a protecting DPI card upon hardware or software failure.

FIG. 3 is a timing diagram 300 illustrating the transition from an active DPI card 110, 120, 130 to a protecting DPI 140 card upon hardware or software failure. Timing diagram 300 includes a horizontal axis indicating time and a vertical axis indicating whether processing is performed on the active or protecting card.

As shown in exemplary timing diagram 300, an application flow 310 begins at time t0, where active card 110, 120, 130 initiates processing. At time t1, the DPI engine contained in active card 110, 120, 130 performs processing to identify the application associated with the flow 310.

At time t2, failure occurs on active card 110, 120, 130, and protecting card 140 takes over activity and resumes processing previously performed by the active card. Thus, at time t2, protecting card 140 retrieves state information regarding flow 310 from its state information block 230, then begins forwarding traffic associated with each of the flows for which hot redundancy was provided. All other flows may bypass protecting card 140, such that these flows are processed without application awareness.

Alternatively, protecting card 140 may provide warm redundancy for the flows not supported by hot redundancy with an option to preempt the warm redundant flows upon congestion of the protecting card. In the event that multiple protecting cards fail at the same time, protecting card 140 may drop support of the warm redundant flows, thereby enabling protecting card 140 to provide hot redundancy for more than failed active card at the same time. For example, protecting card 140 may determine a priority for each warm redundant flow based on at least one of the flow duration, application type, and customer associated with the flow, then drop the lowest priority flows when necessary. Thus, in these situations, the protecting card always provides hot redundancy, while providing warm redundancy as a "best-effort" service pending resource availability on protecting card 140.

In either case, processing of flow 310 continues on protecting card 140 until flow 310 ends at time t3 or until the functionality of active card 140 is restored.

As should be apparent from the description above, in order to implement hot redundancy, protecting card 140 must be aware of the application associated with flow 310 at the time of failure. Accordingly, some mechanism is required to allow protecting card 140 to learn application information regarding flows for which hot redundancy is required for particular user. FIGS. 4-7 illustrate several exemplary embodiments of methods used to enable protecting card 140 to discover the application associated with flow 310.

Figure 4:
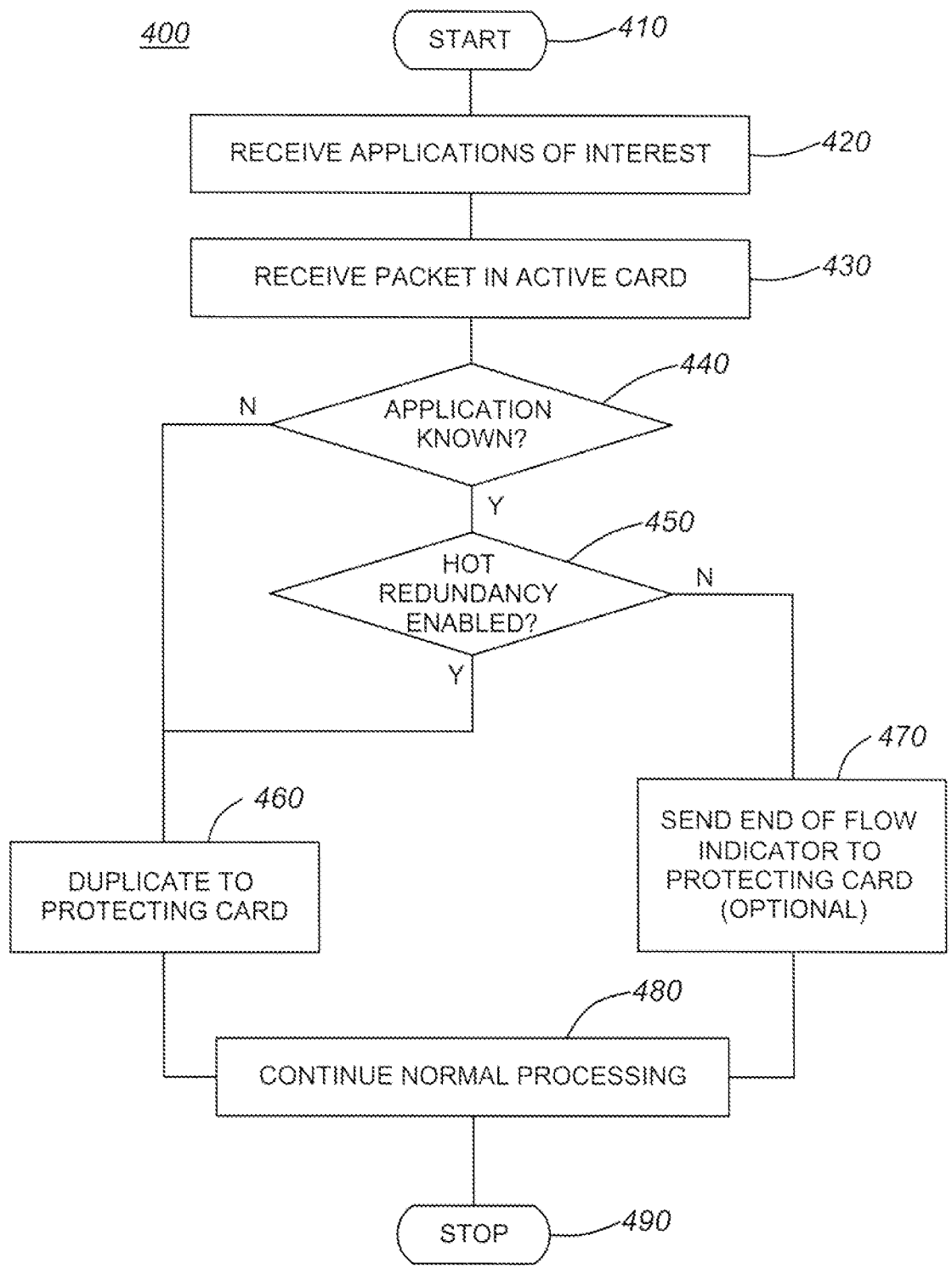
FIG. 4 is a flow chart of a first exemplary embodiment of a method implementing a redundancy scheme on an active card.

FIG. 4 is a flow chart of a first exemplary embodiment of a method 400 implementing a redundancy scheme on an active card 110, 120, 130. As described in further detail below, in this embodiment, active card 110, 120, 130 duplicates at least a portion of the received packets to protecting card 140.

Method 400 starts in step 410 and proceeds to step 420, where active card 110, 120, 130 receives information about applications. In particular, active card 110, 120, 130 receives information that maybe used to identify applications and an indication whether hot redundancy is required for the corresponding application. Active card 110, 120, 130 may receive this information directly via a user configuration process. For example, the user may access a software interface to specify the values or enter the values into a configuration file. Alternatively, active card 110, 120, 130 may receive the application information from a pre-configured file or hardware interface on the card. It should be apparent, however, that any method of specifying application information may be used, provided that active card 110, 120, 130 has access to this information.

Furthermore, the information specified in step 410 may be specified based on the criticality of the particular application, the importance of user participating (e.g. whether the user is the source or destination of a packet), or the average duration of the flow for a particular type of application. For example, the service provider may specify that hot redundancy should be supported for video, VoIP, and teleconferencing, as these flows typically last longer than the Internet average of around thirty seconds, such that hot redundancy is particularly beneficial. In contrast, hot redundancy may not be desired for short duration flows such as email and web browsing, as it may be more efficient to allow the DPI to re-learn the state for those flows or treat them without recognizing the application until they complete. It should therefore be apparent that the information specifying hot-redundant applications is dynamic, advantageously allowing the service provider or other entity to support hot redundancy based on customized preferences.

After receiving information about applications of interest in step 420, exemplary method 400 proceeds to step 430, where the active card 110, 120, 130 receives a packet associated with a flow. Exemplary method 400 then proceeds to decision step 440, where the active card 110, 120, 130 determines whether the application associated with the flow has been identified.

When, in decision step 440, the active card 110, 120, 130 determines that the application is unknown, active card 110, 120, 130 is unaware whether hot redundancy will be required for the flow. Thus, method 400 proceeds to step 460, where active card 110, 120, 130 duplicates the packet to protecting card 140, such that protecting card 140 will have information sufficient to identify the flow should hot redundancy be required.

Alternatively, when, in decision step 440, the active card 110, 120, 130 determines that the application is known, exemplary method 400 proceeds to decision step 450, where it is determined whether hot redundancy is required for the particular application. This decision may be made by retrieving the information received in step 420 and determining whether hot redundancy is required for the application associated with the flow.

When, in decision step 450, it is determined that hot redundancy is required for the flow, exemplary method 400 proceeds to step 466. In step 460, active card 110, 120, 130 duplicates the packet to protecting card 140. Accordingly, in various exemplary embodiments, step 460 enables protecting card 140 to remain hot redundant, as all packets of a hot redundant flow are also sent to protecting card 140. Furthermore, because all packets are sent to protecting card 140, hot redundancy may also be provided for statistical or billing purposes.

As an alternative to duplicating all packets in step 460, active card 110, 120, 130 may only duplicate enough packets to enable protecting card 140 to identify the application associated with the flow. Thus, in various exemplary embodiments, step 460 is only executed until protecting card 140 has enough information to establish state information, thereby allowing protecting card 140 to immediately resume processing in the event of failure on active card 110, 120, 130.

In contrast, when, in decision step 450, it is determined that hot redundancy is not required for the application associated with the current flow, exemplary method 450 proceeds to optional step 470. In step 470, active card 110, 120, 130 sends an end of flow indicator to protecting card 140. The end of flow indicator may be a packet or other message in a format known by protecting card 140. As described further below with reference to FIG. 5, the end of flow indicator enables protecting card 140 to clear information regarding the current flow from its memory. It should be apparent that this step may be performed for only the first packet received after the application is identified, such that a clean-up operation is performed by protecting card 140 only once.

After active-card 110, 120, 130 sends the duplicate packet in step 460 or an end of flow indicator in step 470, exemplary method 400 proceeds to step 480. In step 480, active card 110, 120, 130 performs normal packet processing. In particular, active card 110, 120, 130 may identify the application associated with the flow using deep packet inspection, as described above with reference to DPI processor 210 of FIG. 2. In addition, active card 110, 120, 130 may select a forwarding policy based on the identified application, apply the policy, gather statistics, or perform any other operation. Other typical packet processing operations performed by active card 110, 120, 130 will be apparent to those of ordinary skill in the art. Exemplary method 400 then proceeds to step 490, where exemplary method 400 stops.

Figure 5:
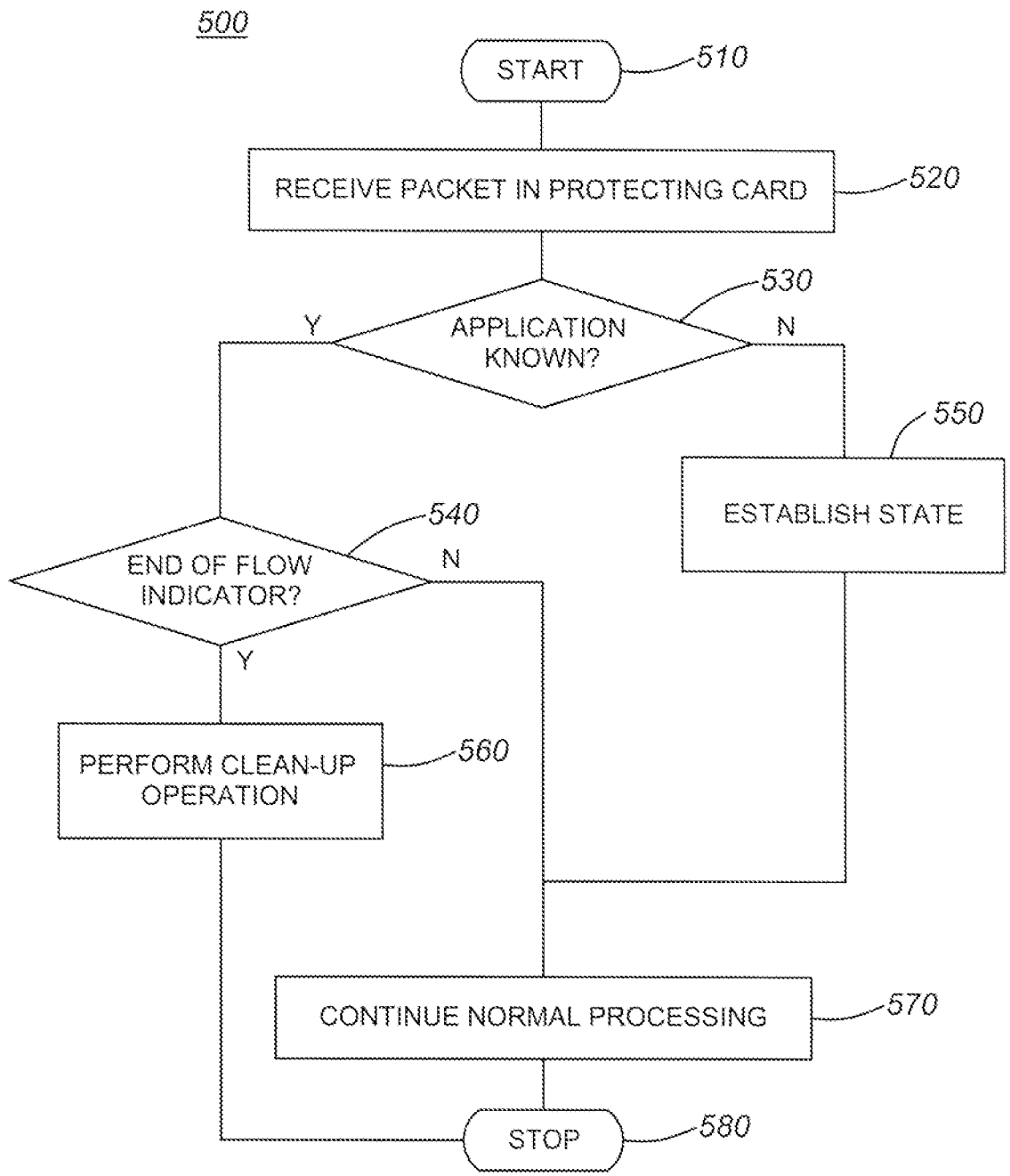
FIG. 5 is a flow chart of a first exemplary embodiment of a method implementing a redundancy scheme on a protecting card.

FIG. 5 is a flow chart of a first exemplary embodiment of a method 500 implementing a redundancy scheme on a protecting card 140. In various exemplary embodiments, method 500 is executed in parallel on a protecting card 140 to process duplicate packets received from an active card 110, 120, 130 executing method 400, described above with reference to FIG. 4.

Exemplary method 500 starts in step 510 and proceeds to step 520, where protecting card 140 receives a duplicated packet from active card 110, 120, 130. Exemplary method 500 then proceeds to decision step 530, where protecting card 140 determines whether the application associated with the flow is known.

When in decision step 530, protecting card 140 determines that the application associated with the flow is known, exemplary method 500 proceeds to decision step 540. In decision step 540, protecting card 140 determines whether the packet received from the active card 110, 120, 130 is an end of flow indicator. When, in decision step 540, it is determined that the packet indicates the end of a flow, exemplary method 500 proceeds to step 560, where protecting card 140 performs a clean-up operation. More specifically, protecting card 140 may remove state information and any other information stored regarding the flow, thereby freeing up any memory used to provide redundancy for the flow. After performing the clean-up operation, exemplary method 500 proceeds to step 580, where exemplary method 500 stops. Alternatively, when it is determined in decision step 540 that the packet is not an end of flow indicator, exemplary method 500 proceeds to step 570, described in further detail below.

Returning to decision step 530, when it is determined that the application associated with the flow is not known, exemplary method 500 proceeds to step 550. In step 550, protecting card 140 performs processing necessary to establish state information for the flow. In particular, protecting card 140 may identify the flow using the packet's IP 5-tuple, which may include a source IP address, destination IP address, source port, destination port, and protocol. Protecting card 140 may also identify the application by performing DPI processing, described in further detail above with reference to DPI processor 210 of FIG. 2. In addition, protecting card 140 may select a policy based on current state information, collect statistics, or perform any other operations related to the state of the application flow. Exemplary method 500 then proceeds to step 570.

In step 570, protecting card 140 continues normal processing of the packet. Thus, protecting card 140 may drop the packet, provide on-the-fly redundancy, or perform any other operations required to implement redundancy. Exemplary method 500 then proceeds to step 580, where exemplary method 500 stops.

Figure 6A:
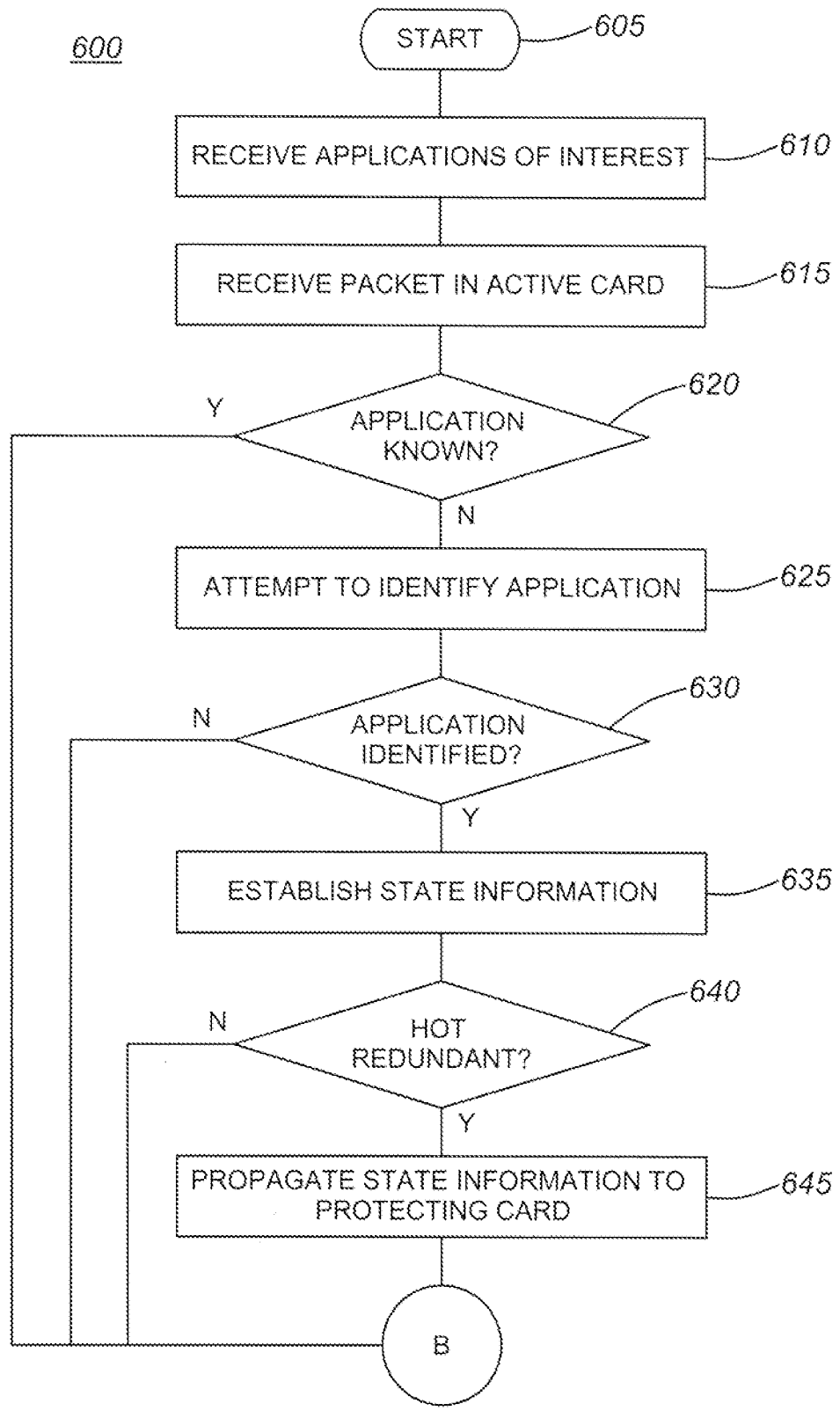
FIGS. 6A and 6B are flow charts of a second exemplary embodiment of a method implementing a redundancy scheme on an active card.
Figure 6B:
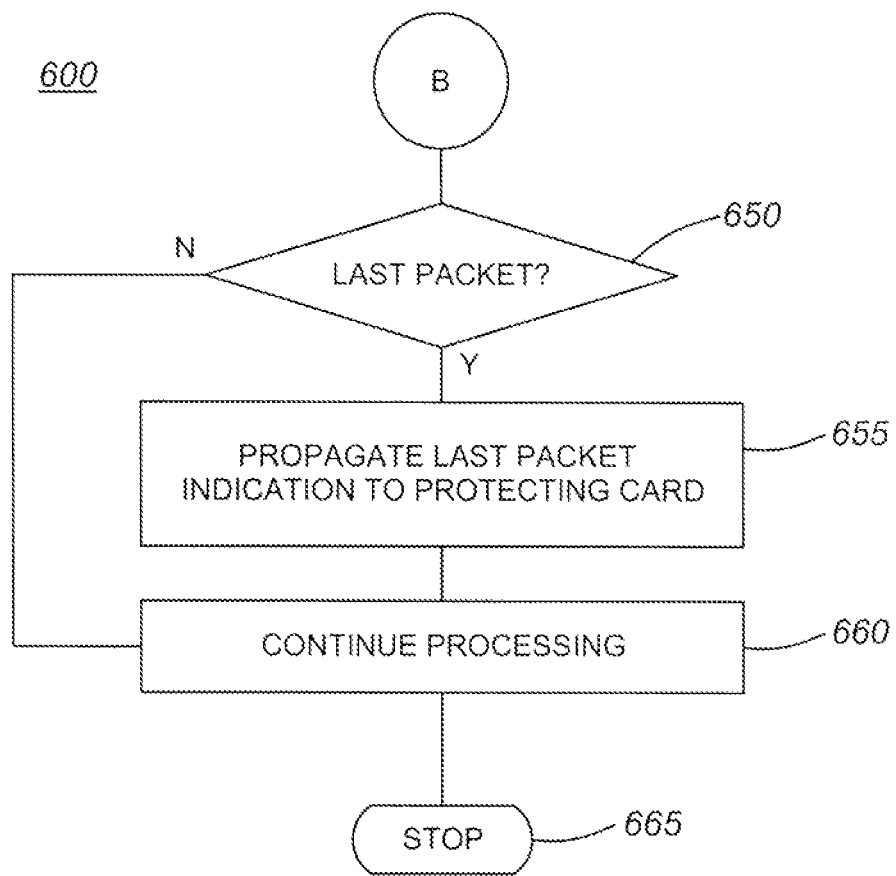

FIGS. 6A and 6B are flow charts of a second exemplary embodiment of a method 600 implementing a redundancy scheme on an active card 110, 120, 130. It should be apparent that method 600 may be executed by an active card 110, 120, 130 as an alternative to the processing of method 400, described above with reference to FIG. 4. Thus, as described in further detail below, rather than duplicating entire packets, active card 110, 120, 130 sends messages containing updates regarding particular flows. It should be apparent that this method of redundancy may therefore reduce the bandwidth required between active cards 110, 120, 130 and protecting card 140.

As illustrated in FIG. 6A, exemplary method 600 starts in step 605 and proceeds to step 610, where active card 110, 120, 130 receives information about applications. In particular, active card 110, 120, 130 receives information that may be used to identify applications and an indication whether hot redundancy is required for the corresponding application. Active card 110, 120, 130 may receive this information directly via a user configuration process. For example, the user may run a software interface to specify the values or enter the values into a configuration file. Alternatively, active card 110, 120, 130 may receive the application information from a pre-configured file or hardware interface on the card. It should be apparent, however, that any method of specifying application information may be used, provided that active card 110, 120, 130 has access to this information.

After receiving information about applications of interest in step 610, exemplary method 600 proceeds to step 615, where the active card 110, 120, 130 receives a packet associated with a flow. Exemplary method 600 then proceeds to decision step 620, where the active card 110, 120, 130 determines whether the application associated with the flow is already known. This decision may be included for efficiency, as active card 110, 120, 130 may have already identified the application associated with the flow using packets that were previously received on active card 110, 120, 130.

When, in decision step 620, it is determined that the application is known, exemplary method 600 proceeds to decision step 650, described further below with reference to FIG. 6B. On the other hand, when it is determined in decision step 620 that the application is not yet known, exemplary method 600 proceeds to step 625, where active card 110, 120, 130 attempts to identify the application associated with the flow. Thus, active card 110, 120, 130 may perform DPI processing to identify the application, as described in further detail above with reference to DPI processor 210 of FIG. 2.

Exemplary method 600 then proceeds to decision step 630, where active card 110, 120, 130 determines whether the application associated with the flow was successfully identified. When it is determined that the application has not been identified, exemplary method 600 proceeds to decision step 650, described further below with reference to FIG. 6B.

Alternatively, when it is determined in decision step 630 that the application has been identified, exemplary method 600 proceeds to step 635. In step 635, active card 110, 120, 130 establishes state information based on the processing performed in step 625. In particular, active card 110, 120, 130 may identify the flow using the packet's IP 5-tuple, which may include a source IP address, destination IP address, source port, destination port, and protocol. Active card 110, 120, 130 may also generate an identifier for the application based on the DPI processing. In addition, active card 110, 120, 130 may select a policy based on current state information. Exemplary method 600 then proceeds to decision step 640.

In decision step 640, active card 110, 120, 130 determines whether hot redundancy is required for the particular application associated with the flow. This decision may be made by accessing the information received in step 610 and determining whether hot redundancy is required for the particular application for the particular user. When, in decision step 640, it is determined that hot redundancy is not required for the flow, exemplary method 600 proceeds to decision step 650, described further below with reference to FIG. 6B.

Alternatively, when it is determined in decision step 640 that hot redundancy is required, exemplary method 600 proceeds to step 645, where active card 110, 120, 130 propagates state information to protecting card 140. In particular, active card 110, 120, 130 may use a message to send any combination of the state information established in step 635 to protecting card 140. The protecting card 140 then processes the message in accordance with method 700, described further below with reference to FIG. 7. Message formats suitable for sending state information from active card 110, 120, 130 to protecting card 140 will be apparent to those of skill in the art. After sending the message to protecting card 140, exemplary method 600 proceeds to step 650.

Referring now to FIG. 6B, in decision step 650, active card 110, 120, 130 determines whether the packet previously received in step 615 is the last packet in the flow. When, in decision step 650, it is determined that the packet is the last packet in the flow, exemplary method 600 proceeds to step 655, where active card 110, 120, 130 sends a last packet message to protecting card 140. Again, message formats suitable for sending the last packet indication will be apparent to those of skill in the art. After sending the last packet message, exemplary method 600 proceeds to step 660. Alternatively, when it is determined in decision step 650 that the packet is not the last packet in the flow, exemplary method 600 proceeds directly to step 660 without forwarding a last packet indication.

In step 660, active card 110, 120, 130 performs normal packet processing. In particular, active card 110, 120, 130 may select application-specific policies, gather statistics, drop or forward the packet, or perform any other operation. Other packet processing operations performed by active card 110, 120, 130 will be apparent to those of ordinary skill in the art. Exemplary method 600 then proceeds to step 665, where exemplary method 600 stops.

Figure 7:
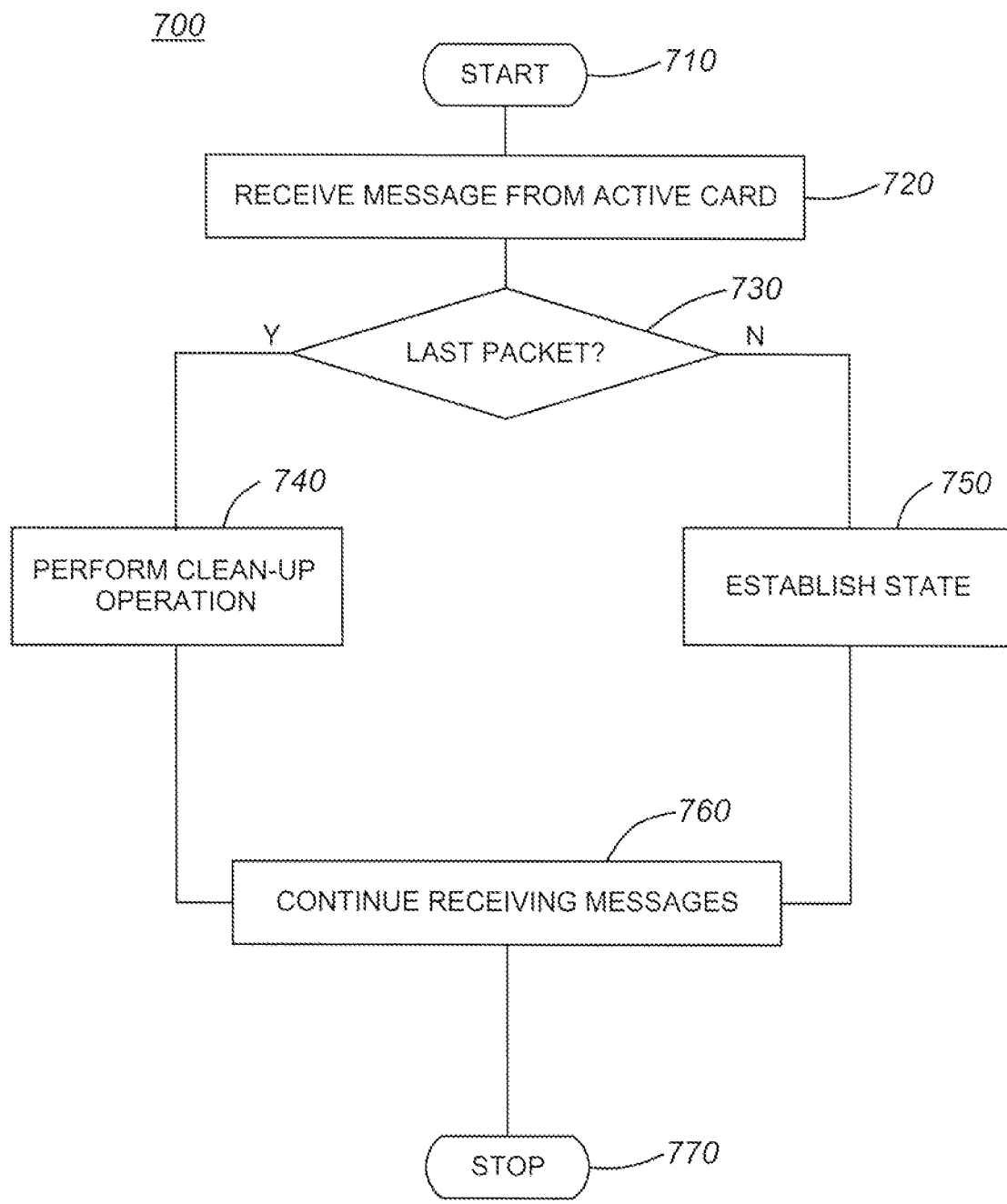
FIG. 7 is a flow chart of a second exemplary embodiment of a method implementing a redundancy scheme on a protecting card.

FIG. 7 is a flow chart of a second exemplary embodiment of a method 700 implementing a redundancy scheme on a protecting card 140. It should be apparent that method 700 may be executed by a protecting card 140 as an alternative to the processing of method 500, described above with reference to FIG. 5. In various exemplary embodiments, method 700 is executed in parallel on a protecting card 140 to process messages received from an active card 110, 120, 130 executing the processing of method 600, described above with reference to FIGS. 6A and 6B.

Exemplary method 700 starts in step 710 and proceeds to step 720, where a protecting card 140 receives a message from the active card 110, 120, 130. Exemplary method 700 then proceeds to decision step 730, where protecting card 140 determines whether the message is a last packet indication.

When, in decision step 730, protecting card 140 determines that the message is a last packet indication, exemplary method 700 proceeds to step 740, where protecting card 140 performs a clean-up operation. More specifically, protecting card 140 may remove state information and any other information stored regarding the flow, thereby freeing up any memory used to provide redundancy for the flow. Exemplary method 700 then proceeds to step 760.

Alternatively, when it is determined in decision step 730 that the message is not a last packet indication, protecting card 140 deduces that the message includes state information for a hot redundant flow. Accordingly, exemplary method 700 proceeds to step 750, where protecting card 140 extracts and stores state information based on the content of the message received from active card 110, 120, 130. In particular, protecting card 140 may extract flow-identifying information, such as an IP 5-tuple, or an application identifier. Protecting card 140 may also extract a policy for the flow from the message received from the active card 110, 120, 130. Alternatively, protecting card 140 may itself derive a policy based on the state information included in the message. Exemplary method then proceeds to step 760.

In step 760, protecting card 140 continues receiving messages from active card 110, 120, 130. Exemplary method 700 then proceeds to step 770, where exemplary method 700 stops.

It should be apparent from the foregoing description of the redundancy schemes depicted in FIGS. 4-7 that protecting card 140 may quickly resume operations upon failure of an active card 110, 120, 130. In particular, active cards 110, 120, 130 and protecting card 140 interact to provide hot redundancy for selected applications. Accordingly, a fast transition occurs for flows associated with these applications when protecting card 140 detects failure of an active card 110, 120, 130.

Thus, according to the foregoing, various exemplary embodiments provide hot redundancy schemes for DPI engines that optimize efficiency using application information. By providing redundancy only for selected applications, various exemplary embodiments allow 1 for N or M for N hot redundancy, such that a single engine may protect multiple active engines. This scheme therefore enables a service provider to decrease costs, while still providing reliable, high availability services.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A packet processing system for providing application-aware hot redundancy, the system comprising:
   a plurality of active devices, each of the plurality of active devices comprising:
      a receiving interface configured to receive a packet belonging to an active flow,
      a processor configured to perform deep packet inspection to identify an application associated with the active flow,
      a forwarding interface configured to forward the packet belonging to the active flow according to a forwarding policy, and
      a redundancy block configured to determine whether the application requires hot redundancy and, if so, to transmit a message from which state information associated with the active flow may be derived; and
   at least one protecting device providing redundancy for the plurality of active devices, wherein the protecting device is in communication with each of the active devices and is configured to:
      receive the message regarding the active flow from a respective active device of the plurality of active devices,
      derive state information from the message, and
      resume packet forwarding operations for the active flow using the state information upon failure of the respective active device.

2. The packet processing system for providing application-aware hot redundancy according to claim 1, wherein the message transmitted by the redundancy block of the respective active device is a duplicate of a packet belonging to the active flow.

3. The packet processing system for providing application-aware hot redundancy according to claim 1, wherein the message transmitted by the redundancy block of the active device includes state information predetermined by the redundancy block of the respective active device.

4. The packet processing system for providing application-aware hot redundancy according to claim 1, wherein the applications for which hot redundancy is required are specified by a service provider based on at least one of an average duration of flows associated with each application and a criticality of each application.

5. The packet processing system for providing application-aware hot redundancy according to claim 1, wherein the state information includes at least one of an Internet protocol 5-tuple, an application identifier, and application policy information.

6. A card for supporting application-aware hot redundancy in a packet processing system, the card comprising:
   a receiving interface configured to receive an incoming packet belonging to an active flow;
   a processor configured to perform deep packet inspection to identify an application associated with the active flow;
   a forwarding interface configured to forward the incoming packet belonging to the active flow according to a forwarding policy; and
   a redundancy block configured to:
      determine whether the application requires hot redundancy and, if so, to transmit a message to a protecting device, the message including sufficient information from which state information associated with the active flow is derived by the protecting device, and
      communicate with the protecting device, such that the protecting device resumes packet forwarding operations for the active flow using the state information upon failure of the card.

7. The card for supporting application-aware hot redundancy in a packet processing system according to claim 6, wherein the message transmitted by the redundancy block is a duplicate of a packet belonging to the active flow.

8. The card for supporting application-aware hot redundancy in a packet processing system according to claim 6, wherein the message transmitted by the redundancy block includes state information predetermined by the redundancy block.

9. The card for supporting application-aware hot redundancy in a packet processing system according to claim 6, wherein the applications for which hot redundancy is required are specified by a service provider based on at least one of an average duration of flows associated with each application and a criticality of each application.

10. A method for providing application-aware hot redundancy in a packet processing system, the method comprising:
   receiving redundancy information indicating applications for which hot redundancy is required;
   receiving an incoming packet on an active device, the incoming packet belonging to an active flow;
   performing deep packet inspection (DPI) to identify an application associated with the active flow;

determining whether hot redundancy is required for the active flow using the identified application and the redundancy information;

forwarding the incoming packet according to a forwarding policy; and duplicating the incoming packet to a protecting device when it is determined that hot redundancy is required.

11. The method for providing application-aware hot redundancy in a packet processing system according to claim 10, wherein the step of duplicating the incoming packet is executed only when the protecting device requires additional information to identify the application associated with the active flow.

12. The method for providing application-aware hot redundancy in a packet processing system according to claim 10, further comprising:

sending an end of flow indicator to the protecting device when it is determined that hot redundancy is not required for the active flow; and in response to receipt of the end of flow indicator on the protecting device, performing a clean-up operation on the protecting device to remove information regarding the active flow from memory.

13. The method for providing application-aware hot redundancy in a packet processing system according to claim 10, further comprising:

receiving the packet on the protecting device; and establishing state information for the active flow on the protecting device when it is determined that the application associated with the active flow is not yet known.

14. The method for providing application-aware hot redundancy in a packet processing system according to claim 13, further comprising:

when the active device fails, utilizing the state information to resume packet forwarding operations for the active flow on the protecting device.

15. The method for providing application-aware hot redundancy in a packet processing system according to claim 10, further comprising:

providing warm redundancy on the protecting device as a best effort service when multiple active devices fail simultaneously, such that the protecting device provides hot redundancy for all flows that require hot redundancy.

16. The method for providing application-aware hot redundancy in a packet processing system according to claim 15, further comprising:

dropping warm redundant flows according to a priority associated with each flow, the priority for each flow determined by considering at least one of a duration of the flow, the application associated with the flow, and a customer associated with the flow.

17. A method for providing application-aware hot redundancy in a packet processing system, the method comprising:

receiving redundancy information indicating applications for which hot redundancy is to be provided;

receiving an incoming packet on an active device, the incoming packet belonging to an active flow;

performing deep packet inspection (DPI) to identify state information associated with the active flow, the state information identifying an application associated with the flow;

determining whether hot redundancy is required for the active flow using the identified application and the redundancy information;

transmitting a message to a protecting device when it is determined that hot redundancy is required, the message including the state information; and forwarding the incoming packet according to a forwarding policy.

18. The method for providing application-aware hot redundancy in a packet processing system according to claim 17, the method further comprising:

transmitting a last packet indication to the protecting device when it is determined that the incoming packet is the last packet in the active flow; and in response to receipt of the last packet indication on the protecting device, performing a clean-up operation on the protecting device to remove information regarding the active flow from memory.

19. The method for providing application-aware hot redundancy in a packet processing system according to claim 17, the method further comprising:

receiving the message on the protecting device;

extracting the state information from the message;

storing the state information on the protecting device.

20. The method for providing application-aware hot redundancy in a packet processing system according to claim 19, further comprising:

when the active device fails, utilizing the state information to resume packet forwarding operations for the active flow on the protecting device.

21. The method for providing application-aware hot redundancy in a packet processing system according to claim 17, further comprising:

providing warm redundancy on the protecting device as a best effort service when multiple active devices fail simultaneously, such that the protecting device provides hot redundancy for all flows that require hot redundancy.

22. The method for providing application-aware hot redundancy in a packet processing system according to claim 17, further comprising:

dropping warm redundant flows according to a priority associated with each flow, the priority for each flow determined by considering at least one of a duration of the flow, the application associated with the flow, and a customer associated with the flow.

* * * * *